US009092522B2

(12) United States Patent
Altenhofen et al.

(10) Patent No.: US 9,092,522 B2
(45) Date of Patent: Jul. 28, 2015

(54) METHOD AND A SYSTEM TO ORGANIZE AND MANAGE A SEMANTIC WEB SERVICE DISCOVERY

(75) Inventors: Michael Altenhofen, Karlsruhe (DE); Andreas Friesen, Steinfeld (DE)

(73) Assignee: SAP SE, Walldorf (DE)

( * ) Notice: Subject to any disclaimer, the term of this patent is extended or adjusted under 35 U.S.C. 154(b) by 2024 days.

(21) Appl. No.: 11/334,342

(22) Filed: Jan. 17, 2006

(65) Prior Publication Data

US 2006/0161655 A1    Jul. 20, 2006

(30) Foreign Application Priority Data

Jan. 17, 2005   (EP) ..................................... 05000810

(51) Int. Cl.
*G06F 15/173*   (2006.01)
*G06F 17/30*    (2006.01)

(52) U.S. Cl.
CPC ............................... *G06F 17/30861* (2013.01)

(58) Field of Classification Search
USPC ................... 709/201–203; 719/313, 316, 317
See application file for complete search history.

(56) References Cited

U.S. PATENT DOCUMENTS

| | | | |
|---|---|---|---|
| 2002/0143819 A1* | 10/2002 | Han et al. ....................... | 707/513 |
| 2004/0059722 A1* | 3/2004 | Yeh et al. ........................... | 707/3 |
| 2004/0111525 A1* | 6/2004 | Berkland et al. .............. | 709/231 |
| 2005/0138173 A1* | 6/2005 | Ha et al. ......................... | 709/225 |

FOREIGN PATENT DOCUMENTS

| | | |
|---|---|---|
| WO | WO-2004102417 A1 | 11/2004 |
| WO | WO 2005017654 A2 * | 2/2005 |

OTHER PUBLICATIONS

Androutsellis-Theotokis et al., "A Survey of Peer-to-Peer Content Distribution Technologies", ACM Computing Surveys, vol. 36, No. 4, Dec. 2004.*
Makkamala et al., "Design of Partially Replicated Destributed Database Systems: An Integrated Methodology," ACM, Proceedings of the 1988 ACM SIGMETRICS conference on Measurement and modeling of computer systems, 1988, p. 187-196.*
Embley et al., "A scheme-driven natural language query translator," Proceedings of the 1985 ACM thirteenth annual conference on Computer Science, p. 292-297, Mar. 1985.*
"European Search Report for Application No. EP 05000810", (Mar. 21, 2005),2 pgs.
Arpinar, I. B., et al., "Ontology-Driven Web Services Composition Platform", *Proceedings of the IEEE International Conference on E-Commerce Technology (CEC 2004)*, (2004),146-152.

(Continued)

*Primary Examiner* — Andrew Goldberg
(74) *Attorney, Agent, or Firm* — Schwegman Lundberg & Woessner, P.A.

(57) ABSTRACT

An example embodiment refers to a method to organize and manage a semantic web service discovery within a network with a distributed architecture of multiple independent network nodes, each node being able to store a subset of semantic web service instances, wherein an assignment of each semantic web service instance to at least one network node is automatically computed based on a defined vocabulary derived from ontologies that is distributed over the network nodes and that is used both in describing and finding that instance on request. An example embodiment further covers a system, a computer program and a computer program product to organize and manage a semantic web service discovery within a network.

17 Claims, 2 Drawing Sheets

(56) References Cited

OTHER PUBLICATIONS

Chun, Soon A., "Policy-Based Web Service Composition", *Proceedings of the 14th International Workshop on Research Issues on Data Engineering: Web Services for E-Commerce and E-Government Applications (RIDE '04)*, (2004),85-92.

Hausmann, Jan H., et al., "Model-Based Discovery of Web Services", *Proceedings of the IEEE International Conference on Web Services (ICWS '04)*, (2004),324-331.

Howard, Randy, et al., "A Knowledge-Based Framework for Dynamic Semantic Web Services Brokering and Management", *Proceedings of the 15th International Workshop on Database and Expert Systems Applications (DEXA '04)*, (2004),174-178.

Sycara, Katia, "Dynamic Discovery, Invocation and Composition of Semantic Web Services", *Proceedings, Third Hellenic Conference on AI—Methods and Applications of Artificial Intelligence (SETN 2004), Lecture Notes in Artificial Intelligence*, vol. 3025, (2004),3-12.

"European Application Serial No. 05000810.1, Summons to Attent Oral Proceedings mailed Aug. 20, 2008", 7 pgs.

Gu, Tao, et al., "A Service-Oriented Middleware for Building Context-Aware Services", *Journal of Network and Computer Applications 28*, (2005), 1-18.

\* cited by examiner

METHOD AND A SYSTEM TO ORGANIZE AND MANAGE A SEMANTIC WEB SERVICE DISCOVERY

CLAIM OF PRIORITY

The present patent application claims the priority benefit of the filing date of European Application (EPO) No. 05000810.1 filed Jan. 17, 2005, the entire content of which is incorporated herein by reference.

TECHNICAL FIELD

The present disclosure relates generally to the field of semantic web services, and more particularly to a system and a method to organize and manage a semantic web service discovery.

DESCRIPTION OF THE RELATED ART

Web services provide a new model of the Web in which software agents exchange dynamic information on demand. This change is especially important for the e-business community, because it provides an opportunity to conduct business faster and more efficiently. Indeed, the opportunity, e.g., to manage supply chains dynamically to achieve the greatest advantage on the market is expected to add great value and increase productivity. On the other hand the automatic management of supply chains opens new challenges: First, web services should locate other services that provide a solution to their problems, second, services should interoperate to compose complex services.

Semantic web service discovery deals with the problem of finding potential candidates that provide expected functionality in a set of available web services by matching their capability descriptions against specified queries, also called goals. As opposed to traditional techniques, where web services descriptions were stored in registries and matches are purely based on syntactical searches over keywords used in the descriptions, semantic web service discovery tries to improve the accuracy of the search results by applying reasoning techniques over semantic annotations on top of existing web service descriptions.

Standards such as SOAP (Simple Object Access Protocol) and WSDL (Web Services Description Language) are designed to provide descriptions of message transport mechanisms, and for describing the interface provided by each service. However, neither SOAP nor WSDL are of any help for the automatic location of web services on the basis of their capabilities. Another emerging XML based standard that tries to close this gap is UDDI (Universal Description, Discovery and Integration). It provides a central registry of businesses and web services. UDDI describes businesses by their physical attributes such as name, address and the services that they provide. In addition, UDDI descriptions are augmented by a set of attributes, called TModels, which describe additional features such as a classification of services within taxonomies such as NAICS (North American Classification System). Because UDDI does not represent service capabilities, it is of no help to search for services on the basis of what they provide.

The article "Ontology-Driven Web Services Composition Platform", of I. Budak Arpinar et al., Proceedings of the IEEE International Conference on E-Commerce Technology, 2004, describes several techniques for composing web services into web processes by using their ontological descriptions and relationships to other services. The need for composing existing web services into more complex services is addressed. The focus lies on automatic composition techniques.

The article "A Knowledge-based Framework for Dynamic Semantic Web Services Brokering and Management", Randy Howard et al., Proceedings of the 15th International Workshop on Database and Expert Systems Applications (DEXA '04), 2004, refers to a general knowledge-based framework for dynamic semantic web services brokering and management. A methodology to broker web services within that framework by using a plurality of different agents is presented. The proposed framework is a comprehensive and overarching framework which addresses in an integrated end-to-end manner the life-cycle of activities involved in brokering and managing semantic web services.

Paolucci et al. (Paolucci M., Takahiro Kawamura, Payne T. R., Sycara K.: "Semantic Matching of Web Services Capabilities," In In Proc. of the International Semantic Web Conference (ISWC'02), Springer Verlag, Sardegna, Italy, June 2002, eprints.ecs. soton.ac.uk/archive/00007606/01/ISWC2002-Matchmaker.pdf) propose a solution based on DAML-S, a DAML-based language for semantic service description, and show how service capabilities are presented in a profile section of a DAML-S description and how a semantic match between advertisements and requests can be performed. DAML stands for DARPA Agent Markup Language and DAML-S corresponds to a DAML-based Web Service ontology.

This proposed additional flexibility and accuracy does not come without additional costs. A logical formulation used to provide semantical information requires computational power that normally limits its feasibility to rather small data sets.

In computer science, an ontology is understood as a formal, explicit specification of a shared conceptualization. "Conceptualization" refers to an abstract model of phenomena in the world by having identified relevant concepts of those phenomena. "Explicit" means that the type of concepts used and the constraints of their use are explicitly defined. "Formal" refers to the fact that the ontology should be machine-readable/-processable. An ontology corresponds to a specification of entities, as they do exist at some area of interest, the so-called domain, and the relationships among them. Ontologies resemble faceted taxonomies but use richer semantic relationships among terms and attributes, as well as strict rules about how to specify terms and relationships. Because ontologies do more than just control a vocabulary, they are thought of as a specific knowledge representation. Thus, it can be called a specification of a conceptualization of a particular knowledge domain.

Verma et al. (Verma K., Sivashanmugam K., Sheth A., Patil A., Oundhakar S., Miller J.: Meteor-S WSDI: "A Scalable Infrastructure of Registries for Semantic Publication and Discovery of Web Services", Journal of Information and Technology and Management (under review), 2004) propose an architecture that tries to reduce the computational costs associated with semantic service discovery by dividing an overall search space into several distinct/disjunctive registries that are deployed and managed in a peer-to-peer infrastructure. Each node in the peer-to-peer network represents a so-called domain derived from a global, specialized ontology, called the registries ontology. Publishing a new semantic web service description requires a human user to choose the most relevant domain specific ontology from the global registries ontology including several interaction operations among the various peers in the network.

During discovery, the domain specific ontology will be derived from the query to route the query to the registry node representing that domain.

Within WSMO/DIP (Web Service Modeling Ontology/Data, Information and Process), the current approach divides the discovery problem into two sub problems: First, a syntactical search is deployed to limit the number of potential candidates. Then, this candidate set of web service descriptions will then be fed into a (central) reasoning component that will try to match these descriptions against the specified goal. The first step, termed key-value-pair search, extracts reasonable information from the specified goal that can then be used to perform a syntactical search over all available web service descriptions based e.g. on key words extracted from non-functional properties of the service descriptions. This approach is described in more detail within the document "Keller U., et al., "WSMO Web Service Discovery, www.wsmo.org/2004/d5/d5.1/v0.1/20041112/d5.1v0.1_20041112.pdf"

DETAILED DESCRIPTION

According to an example embodiment a method to organize and manage a semantic web service discovery within a network with a distributed architecture of multiple independent network nodes is provided. Each node is able to store a subset of semantic web service instances. An assignment of each semantic web service instance to a network node is automatically computed based on a defined vocabulary derived from ontologies that is distributed over the network nodes and that is used both in describing and finding that instance on request. This means that the partitioning of semantic web service instances and their assignment to particular nodes is automatically computed as opposed to Vema et al. which requires human interaction.

According to one embodiment of the proposed method, the method comprises several operations. In a first operation the vocabulary derived from ontologies is computed and imported into the network. In the next operation each word of the defined vocabulary is assigned to at least one network node and written in a node specific index. Afterwards, each semantic web service instance is analyzed with respect to words of the defined vocabulary used in describing that instance. That instance is then accordingly assigned to and published into at least one network node whose node specific index comprises most of the words used in describing the semantic web service instance.

It has to be noted that a fixed vocabulary, namely the vocabulary derived from ontologies, which can be derived from both the web service descriptions and semantic queries, is used to divide an overall search space, as it is provided by the entirety of the semantic web services, into appropriate subsets. "Fixed" means that no syntactical variations of words are used. Thus, when analyzing a semantic web service instance with respect to words of the defined vocabulary there are well-defined words used to describe that instance. If for example a query uses the word "tickets" it would be desirable that this query would also consider service descriptions that use the singular "ticket" or have written the word with a capital "T". This can be avoided by choosing according to the method of an example embodiment a fixed vocabulary directly derived from the ontologies. This accommodates the fact that both service descriptions and goals will only use that terminology that is relevant in their respective domain. In other words, service descriptions and goals that do not share any concept will most likely not match. This defined vocabulary is deposited together with its distribution over the network nodes as an overall index or an algorithm with the help of which the network nodes can be determined to which queries and descriptions have to be routed. Each network node comprises a node specific index of words, which are assigned to that network node. The overall index contains for each word of the defined vocabulary the network nodes where this word is known or used. Thus, the overall index used when searching and publishing a semantic web service instance is computed as a union of the indices for the individual network nodes.

Furthermore, it can be provided according to an example embodiment that the defined vocabulary is dynamically adapted and distributed over the network nodes.

In case that a semantic web service instance is described by one or multiple words of the defined vocabulary which are assigned in common to a subset of network nodes, the semantic web service instance is, according to another possible embodiment of the claimed method, assigned to and published into each of the network nodes of the subset of network nodes. That means, that when a semantic web service instance is "underspecified", e.g. there is no ontology yet known that can be used to put that service into only one category, this service has to be published into all nodes of the network which comprise all words of the defined vocabulary used in describing that semantic web service instance.

It is also possible that in the case that a semantic web service instance that is not describable by any one of the words of the defined vocabulary a new ontology is added to the defined vocabulary. It is possible that the whole vocabulary is generated successively according to such a scenario. Whenever a new semantic web service instance is published the vocabulary is augmented by adding appropriate words from the new ontology used in describing that semantic web service instance to the overall index used for further searching and publishing and to the index of the corresponding network nodes.

An example embodiment also refers to a method to organize and manage a semantic web service discovery within a network with a distributed architecture of multiple independent network nodes, each node storing a subset of semantic web service instances based on a defined vocabulary derived from ontologies that is distributed over the network nodes and that is used both in describing and finding the semantic web services, wherein a search for a given goal within the network comprises several succeeding operations. First, the given goal is analyzed with respect to words of the defined vocabulary used in describing that goal. Afterwards, the search is accordingly only forwarded to those network nodes, which have the highest overlap in "terminology", i.e. which know most of the words used in specifying the goal. Those nodes are provided and revealed as locations where candidate matches are stored, i.e. corresponding semantic web service instances assigned to those nodes have capabilities that are specified with at least one of the words used in describing the given goal. One can think of this as a derivation of a search engine index where for each word the overall index contains the network nodes where this word is known or used. Thus, the overall index used in the search and publishing is computed, as already mentioned, as a union of the indices for the individual network nodes.

It is possible, that in the case where more than one location of a semantic web service instance is provided for the words used in describing the given goal, these duplicates are detected and only one single location is provided. It is possible, that the duplicates are not only detected but also eliminated.

An example embodiment also refers to a method to organize and manage a semantic web service search in order to achieve a given goal within a network with a distributed architecture of multiple independent network nodes, each node storing a subset of semantic web service instances, wherein an assignment and a publishing of each semantic web service instance to at least one network node has been automatically computed based on a defined vocabulary derived from ontologies that is distributed over the network nodes and that is used in describing the given goal so that a search is automatically performed over the network nodes based on the vocabulary used in describing the given goal. Therefore, when searching a semantic web service whose service capabilities can achieve the given goal, the description of the given goal based on the defined vocabulary derived from ontologies leads automatically to an appropriate semantic web service.

An example embodiment also covers a method to organize and manage a semantic web service publishing within a network with a distributed architecture of multiple independent network nodes, each node being able to store a subset of semantic web service instances, wherein an assignment and a publishing of each semantic web service instance to at least one network node is automatically computed based on a defined vocabulary derived from ontologies that is distributed over the network nodes and that is used in describing the semantic web service instances.

In a further embodiment of a method according to an example embodiment the defined vocabulary is chosen as a vocabulary of ontologies. That means that the vocabulary used to divide the overall search space is limited to the ontologies themselves, i.e. to the unique names of the ontologies, regardless of which concepts are defined within those ontologies. This approach is useful in cases where a larger number of competing or distinct ontologies exist.

In still another embodiment of a claimed method the vocabulary of ontologies is particularized by introducing concepts from the ontologies which can either be assigned to coequal network nodes or to appropriate sub-nodes representing a second-level network reachable via corresponding network nodes representing a first-level network.

In other words, this approach can be extended in several ways. First, if the imported ontologies vocabulary is too coarse, one could start introducing concepts, i.e. "words", from those ontologies. E.g. one could further divide "train connection providers" based on the criteria which payment methods they accept or which delivery channels they support. In fact, this can be done at two levels. Either the concepts become so-called first-class citizens, i.e. the vocabulary is augmented with these new words. Or, nodes in the network represent a first level of a hierarchy, i.e. they represent a gateway into a next hierarchy level where the words in the ontology are spread across a second-level network. That means the vocabulary of ontologies is particularized by introducing concepts from the ontologies which can either be assigned to coequal network nodes or to appropriates sub-nodes representing a second-level network reachable via corresponding network nodes representing a first-level network.

In still another possible embodiment of a method according to an example embodiment ontologies can also be nested, i.e. higher-level ontologies are imported by more specific ones. In this case, a search will be performed by recursively following imported-ontologies links.

An example embodiment further covers a system to organize and manage a semantic web service discovery. The system comprises a network with a distributed architecture of multiple independent network nodes, each node storing a subset of semantic web service instances, wherein a partitioning and an assignment of the semantic web service instances to particular network nodes is based on a defined vocabulary derived from ontologies that is distributed over the network nodes and that is used both in describing and finding the semantic web service instances on request.

An example embodiment also refers to a system to organize and manage a semantic web service discovery, the system comprising a network with a distributed architecture of multiple independent network nodes, each node being occupied by at least one word of a defined vocabulary derived from ontologies, the vocabulary being used both in describing and finding semantic web service instances, and each node being able to store a subset of semantic web service instances, wherein a semantic web service instance is assigned to a network node based on the at least one word assigned to said network node.

Furthermore, it is possible that a system according to an example embodiment comprises a searching component configured to search, for a given goal, the location of one or more appropriate semantic web service instances within the network based on the defined vocabulary and a publishing component configured to assign a semantic web service instance to a network node based on the defined vocabulary. The searching component and the publishing component use an overall index that is computed as a union of indices for the individual network nodes.

Furthermore it is possible that the searching component is able to detect and to eliminate duplicates.

In another possible embodiment of that system according to an example embodiment the publishing component is able to augment the vocabulary by introducing new words which are assigned to coequal network nodes or to appropriate sub-nodes representing a second-level network and reachable via network nodes representing a first-level network.

In this case, the publishing component not only routes a semantic web service instance which has to be published to one or more corresponding network nodes, but also augments the overall index and therefore the defined vocabulary. This can be necessary either if there is no ontology yet known that can be used to describe a semantic web service instance or if the imported vocabulary is too coarse. In the latter case it is possible to introduce concepts from the ontologies.

This task can also be performed by a further additional component of the system.

According to an example embodiment the nodes in the network represent a division of an overall search space into subsets. A given goal is therefore parsed to extract used words of the fixed vocabulary. Then the searching component computes the distribution of those words in the vocabulary over the nodes in the network. One can think of this as a derivation of a search engine index where for each word the index contains the network nodes where this word is known or used. Thus, the index used in the searching and also in the publishing component is computed as a union of indices for the individual network nodes. In case the queries or goals are forwarded to more than one node, the respective component provides an algorithm to detect and eliminate duplicates.

One approach to divide the overall search space is to limit the vocabulary to the ontologies themselves, i.e. to the unique names of the ontologies, regardless of which concepts are defined within those ontologies.

Furthermore, an example embodiment refers to a system to organize and manage a semantic web service publishing, the system comprising a network with a distributed architecture of multiple independent network nodes, each node storing a subset of semantic web service instances, wherein the partitioning, assignment and publishing of the semantic web service instances to particular network nodes is automatically computed based on a defined vocabulary that is distributed over the network nodes and that is used in describing the respective instances.

In an embodiment of the system to organize and manage a semantic web service publishing, the system comprises a publishing component configured to assign a semantic web service instance to a network node based on the defined vocabulary.

Furthermore, an example embodiment refers to a system to organize and manage a semantic web service search in order to achieve at least one given goal, the system comprising a network with a distributed architecture of multiple independent network nodes, each node storing a subset of semantic web service instances, wherein the partitioning, assignment and publishing of the semantic web service instances to particular network nodes is automatically computed based on a defined vocabulary that is distributed over the network nodes and that is used both in describing the respective instances and the given goal which has to be achieved.

In a possible embodiment of the system to organize and manage a semantic web service search, the system comprises a searching component configured to search for a given goal the location of one or more appropriate semantic web service instances within the network based on the defined vocabulary used in describing the given goal.

In a possible embodiment of one of the systems according to an example embodiment the defined vocabulary is chosen directly from ontologies and/or limited to ontologies. It is to be noted that the defined vocabulary is a fixed vocabulary, which means that there are no syntactical variations of words.

An example embodiment further covers a computer program product with a computer-readable medium and a computer program stored on the computer-readable medium with a program code that is suitable for carrying out a method according to an example embodiment.

A computer program is also provided with a program code which is suitable for carrying out a method according to an example embodiment.

An example embodiment also refers to a computer-readable medium with a computer program stored thereon, the computer program comprising a program code, which is suitable for carrying out a method according to an example embodiment.

Further features and embodiments will become apparent from the description and the accompanying drawings.

It will be understood that the features mentioned above and those described hereinafter can be used not only in the combination specified but also in other combinations or on their own, without departing from the scope of an example embodiment.

The invention is schematically illustrated in the drawings by way of an example embodiment and is explained in detail with reference to the drawings. It is understood that the description is in no way limiting on the scope of an example embodiment and is merely an illustration of an embodiment of the invention It should be understood that while the embodiments are described in terms of a specific system, that embodiments may have applications in a variety of communication systems, such as advanced cable-television systems, at once telephone networks or any other communication system that would benefit from the system or the method according to an example embodiment. It is intended that the system used in the specification and claims is reached to cover any communication system unless the context requires otherwise.

Figure 1:
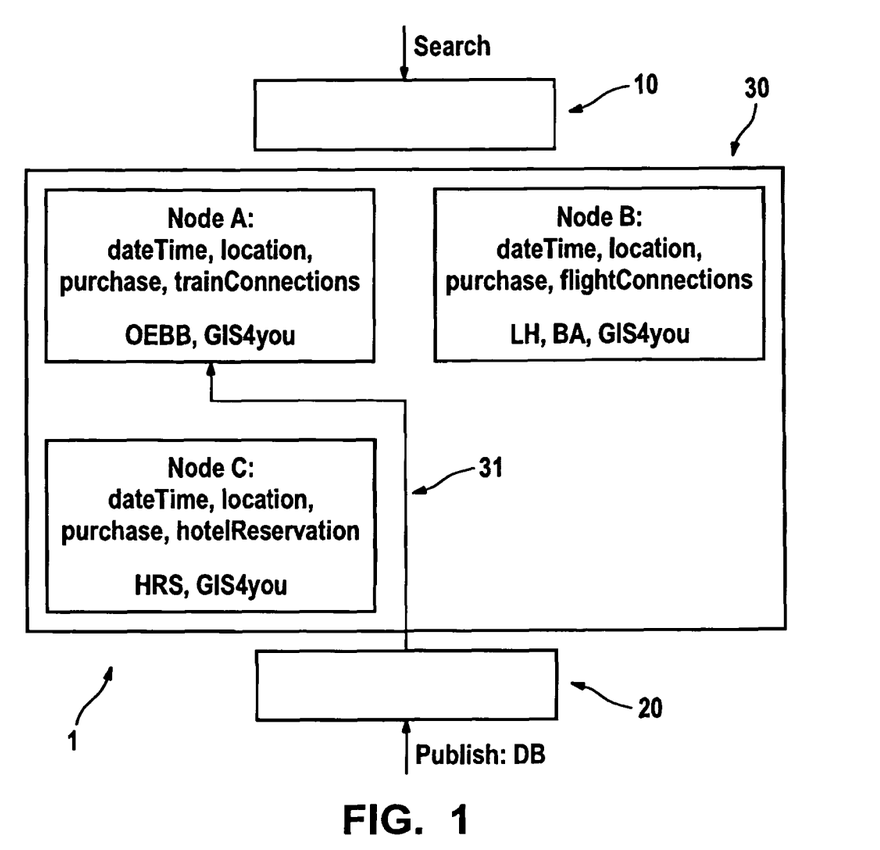
FIG. 1 shows a schematic diagram of an embodiment of the system according to an example embodiment.

FIG. 1 shows a possible embodiment of a system to organize and manage a semantic web service discovery. The system 1 comprises a searching component 10, a publishing component 20 and a network 30 with a distributed architecture of multiple independent network nodes. Among those network nodes three network nodes Node A, Node B and Node C are shown. The searching component 10 and the publishing component 20, each has access to the network 30 via an appropriate interface.

In this sample configuration a vocabulary is used as a defined and fixed vocabulary, which is limited to unique names of ontologies. There are six different ontologies used within this sample configuration. These ontologies are the following: "dateTime", "location", "purchase", "trainConnections", "flightConnections", and "hotelReservations". Each ontology is assigned to at least one network node. The ontologies "dateTime", "location" and "purchase" are assigned to all of the nodes which are shown, namely to Node A, Node B and Node C. The ontology "trainConnections" is only assigned to Node A, the ontology "flightConnections" is only assigned to Node B and the ontology "hotelReservations" is assigned to Node C. The system comprises six different semantic web service instances, namely "OEBB", "DB", "LH", "BA", "HRS" and "GIS4you". "OEBB" and "DB" provide services to book train tickets. "LH" and "BA" deal with flight tickets. "HRS" allows customers to book hotel rooms via a web service interface. "GIS4you" provides a free service to lookup map coordinates for cities around the world. Each of those semantic web service instances is analyzed with respect to ontologies used in describing that instance. Note that all service instances are described using concepts from the "location" ontology, and all commercial service instances use concepts from the "purchase" and "dateTime" ontologies. Additionally, for "OEBB" and "DB", which provide services to book train tickets, the ontology "trainConnections" can be used in describing those instances. While "OEBB" is already assigned to Node A, "DB" is about to be published into Node A as indicated by an arrow 31. "LH" and "BA" deal with flight tickets, therefore the ontology "flightConnections" can be used to describe the particular capabilities of these instances. "HRS" can be assigned to the ontology "hotelReservations". According to that analysis, each of those semantic web service instances is assigned to the corresponding network nodes. Therefore, "OEBB" and "DB" are assigned to network node A since A knows all words used in the descriptions of those instances. "LH" and "BA" are assigned to network node B and "HRS" is assigned to network node C. The service "GIS4you" is "underspecified", i.e. there is no specific ontology yet known that can be used to put that service into only one category. It only uses concepts from the "location" ontology which is also used for all other instance descriptions. Thus, the service "GIS4you" has been published into all nodes of the network that know about the "location" ontology, which in this example embodiment are node A, B, and C.

A given goal, as for example "buying a train ticket from Innsbruck to Frankfurt, departing from Innsbruck on 17 Jul. 2004 at 6:00 p.m." is parsed to extract the used ontologies, in this example "trainConnections", "dateTime", "location" and "purchase". The searching component 10 now routes the search to only those nodes, which know most/all of the ontologies used. In this case, this is only Node A, because of the following logical equation:

{A,B,C}∩{A,B,C}∩{A,B,C}∩{A}={A}

All nodes know about "dateTime", "location" and "purchase", but only Node A knows about "trainConnections".

If one would search for a "coordinate lookup service" using only the "location" ontology, the search would be forwarded to all three nodes since all know about the "location" ontology. In case the succeeding semantic discovery operation on each node would yield "GIS4you" as a match that instance would be returned three times. In this case, the searching component 10 would then detect these duplicates and only return a single result.

The approach of this example can be extended in several ways. First, if the imported ontologies vocabulary is too coarse, concepts from those ontologies can be introduced. The ontology "trainConnections" can be further divided based on the criteria which payment methods are accepted, as for example "po:creditCard", or which delivery channels are supported, as for example "po:onlineDelivery". This can be done at two levels: Either the concepts become first-classed citizens, i.e. the vocabulary is augmented with these new words, or, nodes in the network represent the first level of a hierarchy, i.e. they represent a gateway into a next hierarchy level where the words in the ontology are spread across a second-level network. Furthermore, ontologies can also be nested. In this case, a search would be performed by recursively following imported-ontologies links.

Figure 2:
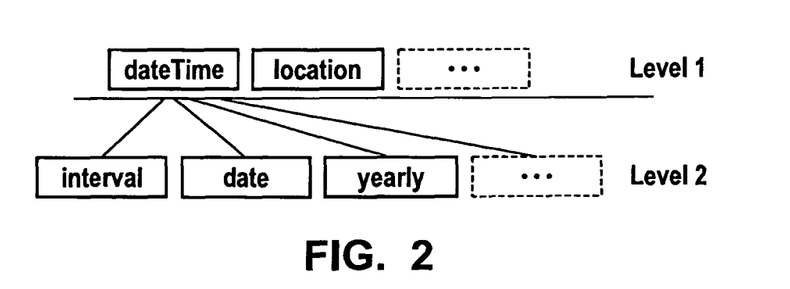
FIG. 2 shows a schematic diagram of an embodiment of the method according to an example embodiment.

FIG. 2 shows a further example of an embodiment of the method according to an example embodiment. FIG. 2 illustrates one possibility to refine an imported defined vocabulary in the case that the imported defined vocabulary is too coarse. The ontologies of the vocabulary are "dateTime" and "location". In order to refine those ontologies it is possible to introduce concepts from those ontologies. As it is shown in FIG. 2 one could divide the ontology "dateTime" based on the criteria which time period is considered or which exact date is concerned. Therefore, the ontology "dateTime" can be divided in terms as for example "interval", "date" and "yearly". In fact, this division can be done at two levels. Either the concepts "interval", "date", "yearly" become so-called first-class citizens, i.e. the vocabulary would be augmented with these new words. That means that those new words are put on par with the other words of the vocabulary. They coexist with the other words in parallel. Alternatively, some nodes in the network represent a first level of a hierarchy, as indicated in FIG. 2. As shown in this figure, nodes to which the ontology "dateTime" is assigned become nodes of the first level. They represent a gateway in a next hierarchy level where the words in the ontology are spread across a second-level network. As shown in FIG. 2, the words "interval", "date", "yearly" in the ontology "dateTime" are arranged in a second level. The words "interval", "date" and "yearly" are subordinated words with respect to the word "dateTime". They can be subsumed by the word "dateTime" which is in that case a superordinated word. The vocabulary is configured according to a tree structure.

Figure 3:
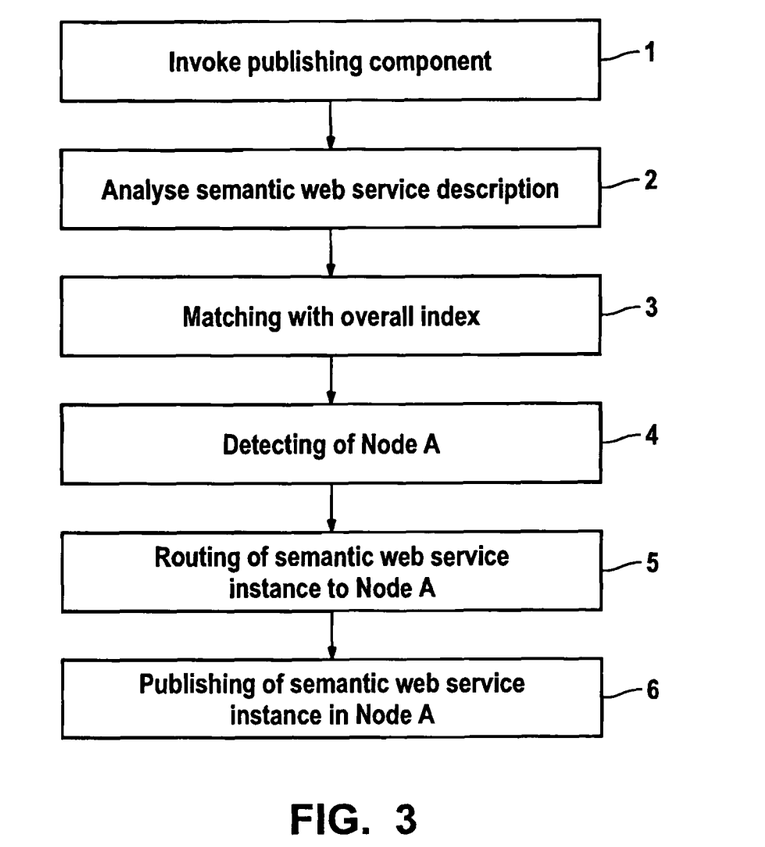
FIG. 3 shows a flowchart of another embodiment of the method according to an example embodiment.

FIG. 3 shows a flowchart of a further embodiment of the method according to an example embodiment. Starting from the fact that a semantic web service instance "DB" which provides services to book train tickets has to be published, a publishing component is invoked in operation 1. In operation 2 the publishing component analyzes the semantic web service instance description "DB" with respect to words of a defined vocabulary derived from ontologies. As a result of such an analysis the following words are found: "dateTime", "location", "purchase" and "trainConnections". In operation 3 the publishing component compares those words with an overall index in which all words of the defined vocabulary are deposited together with network nodes to which they are assigned. With help of that comparison the publishing component detects in operation 4 network node A that knows all the words used in describing the semantic web service instance. That means that all the words used in describing the semantic web service instance have been assigned to network node A. That's the reason why network node A matches best with the description of the semantic web service instance. Therefore, in operation 5 the semantic web service instance is routed to network node A in order to be published as assigned to the node A.

It is also possible that the semantic web service instance is "underspecified" so that there are according to the overall index multiple network nodes to which the instance has to be routed because the words used in describing that "underspecified" semantic web service instance have been assigned to multiple nodes, each node includes however besides those words one or more further words of the vocabulary which are assigned to that respective node. The overall index can be a table in which the respective assignments are listed.

In the following, a pseudo-code example is given to further illustrate the above embodiment of the method according to an example embodiment. It contains the formal description of the example goal "buying a train ticket from Innsbruck to Frankfurt, departing from Innsbruck on 17 Jul. 2004 at 6:00 p.m.". Analyzing the goal would concentrate on extracting the ontologies used by parsing the block after the keyword importedOntologies. Within this example a so-called WSMO/WSML (Web Service Modeling Ontology/Web Service Modeling Language)-syntax is used.

```
namespace
    <<http://www.wsmo.org/2004/d3/d3.3/v0.1/20041105/resources/goal#>>
        dc:<<http://purl.org/dc/elements/1.1#>>
        dt:<<http://www.wsmo.org/ontologies/dateTime#>>
        tc:<<http://www.wsmo.org/ontologies/trainConnection#>>
        po:<<http://www.wsmo.org/ontologies/purchase#>>
        loc:<<http://www.wsmo.org/ontologies/location#>>
        kb:<<http://www.wsmo.org/ontologies/kb#>>
        wsml:<<http://www.wsmo.org/2004/d2/#>>
        xsd:<<http://www.w3.org/2001/XMLSchema#>>
    goal <<http://www.wsmo.org/2004/d3/d3.3/v0.1/20041105/resources/goal.wsml>>
        nonFunctionalProperties
            dc:title hasValue "Buying a train ticket from Innsbruck to Frankfurt on..."
            dc:creator hasValue "DERI International"
            dc:subject hasValues {"Train Tickets", "Online Ticket Booking", "Train
``` trip"}
  dc:description hasValue "Express the goal of buying a concrete ticket for a train trip"
  dc:publisher hasValue "DERI International"
  dc:contributor hasValues{"Michael Stollberg",
   <<http://www.deri.org/foaf#lara>>,
   <<http://homepage.uibk.ac.at/~c703240/foaf.rdf>>,
   <<http://homepage.uibk.ac.at/~c703262/foaf.rdf>>,
   <<http://www.deri.org/foaf#haller>>}
  dc:date hasValue "2004-10-04"
  dc:type hasValue <<http://www.wsmo.org/2004/d2#goals>>
  dc:format hasValue "text/html"
  dc:identifier hasValue
<<http://www.wsmo.org/2004/d3/d3.3/v0.1/20041008/resources/goal.wsml>>
  dc:language hasValue "en-US"
  dc:relation hasValues {<<http://www.wsmo.org/ontologies/dateTime>>,
   <<http://www.wsmo.org/ontologies/trainConnection>>,
   <<http://www.wsmo.org/ontologies/purchase>>,
   <<http://www.wsmo.org/ontologies/location>>}
  dc:coverage hasValue "ID:7029392 Name:World"
  dc:rights hasValue <<http://deri.at/privacy.html>>
  version hasValue "$Revision: 1.3 $"
endNonFunctionalProperties comment: all mediators and ontologies are inherited from the GG Mediator usedMediators
  ggMediator
<<http://www.wsmo.org/2004/d3/d3.3/v0.1/20041105/resources/ggm1.wsml>>
  importedOntologies {<<http://www.wsmo.org/ontologies/dateTime>>,
   <<http://www.wsmo.org/ontologies/trainConnection>>,
   <<http://www.wsmo.org/ontologies/purchase>>,
   <<http://www.wsmo.org/ontologies/location>>} comment: the constants defined in the logical expressions refer to instances defined in the VTA Use Case Knowledge Base postcondition
  axiom purchasingTicketForSpecificTraintrip
   nonFunctionalProperties
    dc:description hasValue "The goal postcondition specifies that Tim Berners-Lee wants
    to go buy a train ticket from Innsbruck to Frankfurt, departing from innsbruckHbf
    on 17th July 2004 at 6 p.m."
   endNonFunctionalProperties
   definedBy
   ?Purchase memberOf po:purchase[
    purchaseorder hasValue ?Purchaseorder,
    buyer hasValue ?Buyer
   ] and
   ?Buyer memberOf po:buyer[
    contactInformation hasValue ?TBLContactInformation,
    billToAddress hasValue ?TBLAddress,
    hasPayment hasValues {?PaymentMethod}
   ] and
   ?TBLContactInformation memberOf po:contactInformation[
    name hasValue "Tim Berners-Lee",
    emailaddress hasValue "tbl@w3c.org"
   ] and
   ?TBLAddress memberOf loc:address[
    streetAddress hasValue "32 Vassar Street",
    city hasValue boston,
    state hasValue massachusetts,
    country hasValue usa
   ] and -continued    ?Purchaseorder memberOf po:purchaseOrder[
    product hasValues {?Product},
    payment hasValue ?PaymentMethod
   ] and
   ?PaymentMethod memberOf po:creditCard[
    type hasValue masterCard,
    creditCardNumber hasValue 5535446466867747,
    holder hasValue "Tim Berners-Lee",
    expMonth hasValue 09,
    expYear hasValue 2007
   ] and
   ?Product memberOf po:product[
    item hasValues {?Ticket}
   ] and
   ?Ticket memberOf tc:ticket[
    itinerary hasValue ?Itinerary
   ] and
   ?Itinerary memberOf tc:itinerary[
    passenger hasValue ?Passenger,
    trip hasValue ?Trip
   ] and
   ?Passenger memberOf tc:person[
    name hasValue "Tim Berners-Lee"
   ] and
   ?Trip memberOf tc:trainTrip[
    start hasValue kb:innsbruckHbf,
    end hasValue kb:frankfurtHbf,
    departure hasValue ?Departure
   ] and
   ?Departure memberOf dt:dateAndTime[
    date hasValue ?DepartureDate,
    time hasValue ?DepartureTime
   ] and
   ?DepartureDate memberOf dt:date[
    dayOfMonth hasValue 17,
    monthOfYear hasValue 07,
    year hasValue 2004

-continued

```
        ] and
        ?DepartureTime memberOf dt:time[
                hourOfDay hasValue 18
        ].
    effect
        axiom getTicketDelivererd
            nonFunctionalProperties
                dc:description hasValue "The goal effect specifies
                that Tim Berners-
Lee gets
                the purchased ticket delivered via emial."
            endNonFunctionalProperties
            definedBy
            ?Delivery memberOf po:onlineDelivery[
                    deliveryItem hasValues {?Product},
                    receiver hasValue ?Buyer,
                    onlineDeliveryMethod hasValue "email"
            ] and
            ?Product memberOf po:product[
                    item hasValues {?Ticket}
            ] and
            ?Buyer memberOf po:buyer[
                    contactInformation hasValue
                    ?TBLContactInformation,
                    shipToAddress hasValue ?TBLAddress,
                    hasPayment hasValues {?PaymentMethod}
            ] and
            ?TBLContactInformation memberOf
            po:contactInformation[
                    name hasValue "Tim Berners-Lee",
                    emailaddress hasValue "tbl@w3c.org"
            ] and
            ?TBLAddress memberOf loc:address[
                    streetAddress hasValue "32 Vassar Street",
                    city hasValue boston,
                    state hasValue massachusetts,
                    country hasValue usa
            ] and
            ?Ticket memberOf tc:ticket[
                    itinerary hasValue ?Itinerary
            ] and
            ?Itinerary memberOf tc:itinerary[
                    passenger hasValue ?Passenger,
                    trip hasValue ?Trip
            ] and
            ?Passenger memberOf tc:person[
                    name hasValue "Tim Berners-Lee"
            ] and
            ?Trip memberOf tc:trainTrip[
                    start hasValue kb:innsbruckHbf,
                    end hasValue kb:frankfurtHbf,
                    departure hasValue ?Departure
            ] and
            ?Departure memberOf dt:dateAndTime[
                    date hasValue ?DepartureDate,
                    time hasValue ?DepartureTime
            ] and
            ?DepartureDate memberOf dt:date[
                    dayOfMonth hasValue 17,
                    monthOfYear hasValue 07,
                    year hasValue 2004
            ] and
            ?DepartureTime memberOf dt:time[
                    hourOfDay hasValue 18
            ].
```

What is claimed is:

1. A method of organizing and managing a semantic web service discovery within a network with a distributed architecture of multiple independent network nodes, each node being able to store a subset of semantic web service instances, each semantic web service instance associated with a unique vocabulary used by the semantic web service to process a request, wherein an assignment of each semantic web service instance to at least one network node is automatically computed based on a defined vocabulary derived from known ontologies, the defined vocabulary distributed over the network nodes so that each network node is associated with a set of the ontologies and at least a portion of the defined vocabulary, the defined vocabulary used both in describing and finding a particular web service instance on request, the finding of the particular web service instance on request comprises parsing a query based on the known ontologies to identify a set of defined vocabulary terms that, collectively, have the same meaning as the query and routing the parsed query to particular network nodes that contain most or all of the ontologies used to parse the query.

2. The method according to claim 1, the method further comprising at least the following operations:
   computing and importing the defined vocabulary into the network, wherein the defined vocabulary is based on descriptions of semantic web service instances and user queries, and
   assigning each word of the defined vocabulary to at least one network node.

3. The method according to claim 2, wherein in the case that at least one of the semantic web service instance is described by one or multiple words of the defined vocabulary which are each assigned to a subset of network nodes, the at least one semantic web service instance is assigned to and published into each of the network nodes of the subset of network nodes.

4. The method according to claim 1, wherein the defined vocabulary is dynamically adapted and distributed over the network nodes.

5. The method according to claim 1, wherein for a semantic web service instance not yet describable by the defined vocabulary a further ontology is introduced and the vocabulary is augmented by at least one word derived from that further ontology.

6. The method of claim 1, wherein the query is a natural language query.

7. A method of organizing and managing a semantic web service discovery within a network with a distributed architecture of multiple independent network nodes, each node storing a subset of semantic web service instances, each semantic web service instance associated with a unique vocabulary used by the semantic web service to process a request, an assignment of the subset of semantic web service instances to the each node based on a defined vocabulary derived from known ontologies, the defined vocabulary distributed over the network nodes so that each network node is associated with a set of the ontologies and at least a portion of the defined vocabulary, the defined vocabulary used both in describing and finding the semantic web services, wherein a search for a given goal within the network comprises at least the following operations:
   analyzing, using the ontologies, one or more natural language terms of the given goal to identify words of the defined vocabulary corresponding to the given goal, at least a portion of the words of the defined vocabulary used in describing the given goal being derived from two or more of the ontologies, and
   forwarding the given goal to only a set of the network nodes that contain most of the words of the defined vocabulary used in describing the given goal.

8. The method according to claim 7, wherein if more than one network node is provided for one and the same of the corresponding semantic web service instances, the given goal is forwarded to only one of the set of the network nodes.

9. The method according to claim 7, wherein the defined vocabulary is particularized by introducing concepts from the ontologies that can either be assigned to coequal network nodes or to appropriate sub-nodes representing a second-level network reachable via corresponding network nodes representing a first-level network.

10. The method according to claim 7, wherein the ontologies are nested.

11. A method of organizing and managing a semantic web service publishing within a network with a distributed architecture of multiple independent network nodes, each node being able to store a subset of semantic web service instances, each semantic web service instance associated with a unique vocabulary used by the semantic web service to process a request, wherein an assignment and a publishing of each semantic web service instance to at least one network node is automatically computed based on a defined vocabulary derived from known ontologies, the defined vocabulary distributed over the network nodes so that each network node is associated with a set of the ontologies and at least a portion of the defined vocabulary, the defined vocabulary used in describing the semantic web service instance, the defined vocabulary further used in finding the semantic web service instance on request by parsing a query based on the known ontologies to identify a set of defined vocabulary terms that, collectively, have the same meaning as the query and routing the parsed query to the particular network nodes that contain most or all ontologies used to parse the query.

12. A method of organizing and managing a semantic web service search in order to achieve a given goal within a network with a distributed architecture of multiple independent network nodes, each node storing a subset of semantic web service instances, each semantic web service instance associated with a unique vocabulary used by the semantic web service to process a request, wherein an assignment and a publishing of each semantic web service instance to at least one network node has been automatically computed based on a defined vocabulary derived from known ontologies, the defined vocabulary distributed over the network nodes so that each network node is associated with a set of the ontologies and at least a portion of the defined vocabulary, the defined vocabulary containing defined vocabulary terms used to describe the given goal, the defined vocabulary terms selected based on the known ontologies so that a search is automatically performed over the network nodes based on the defined vocabulary terms used in describing the given goal, the defined vocabulary further used in finding the semantic web service instance on request by parsing a query based on the known ontologies to identify a set of defined vocabulary terms that, collectively, have the same meaning as the query and routing the parsed query to the particular network nodes that contain most or all ontologies used to parse the query.

13. A system to organize and manage a semantic web service discovery, the system comprising a network with a distributed architecture of multiple independent network nodes, each node to store a subset of semantic web service instances, each semantic web service instance associated with a unique vocabulary used by the semantic web service to process a request, wherein the semantic web service instances are partitioned and assigned to particular network nodes is based on a defined vocabulary that is distributed over the network nodes and that is used both in describing and finding the respective instances on request, the defined vocabulary derived from known ontologies based at least on the unique vocabulary and queries for the semantic web service instance, finding the respective semantic web service instance on request comprises parsing a query based on the ontologies to identify a set of defined vocabulary terms that, collectively, have the same meaning as the query and routing the parsed query to particular network nodes that contain most or all defined vocabulary terms parsed from the query.

14. A system to organize and manage a semantic web service discovery, the system comprising a network with a distributed architecture of multiple independent network nodes, each node being occupied by at least one word of a defined vocabulary derived from known ontologies, the defined vocabulary to be used both to describe and find semantic web service instances, each semantic web service instance associated with a unique vocabulary used by the semantic web service to process a request, the unique vocabulary to be processed using the known ontologies to identify the at least one word of the defined vocabulary that corresponds to the semantic web service instance, each node being able to store a subset of semantic web service instances, wherein a semantic web service instance is to be assigned to a network node based on the at least one word of the defined vocabulary assigned to said network node, wherein a respective semantic web service instance is found in response to a query by parsing the query based on the ontologies to identify a set of defined vocabulary terms that, collectively, have the same meaning as the query and routing the parsed query to a portion of the multiple independent network nodes that contain most or all ontologies used to parse the query.

15. A system to organize and manage a semantic web service search in order to achieve at least one given goal, the system comprising a network with a distributed architecture of multiple independent network nodes, each node to store a subset of semantic web service instances, each semantic web service instance associated with a unique vocabulary to be used by the semantic web service to process a request, wherein the semantic web service instances are partitioned and assigned to particular network nodes automatically based on a defined vocabulary derived from known ontologies, the defined vocabulary to be distributed over the network nodes so that each network node is associated with a set of the ontologies and at least a portion of the defined vocabulary, the defined vocabulary to be used both to describe the respective web service instances and the given goal, wherein the respective web service instances are found in response to the given goal by parsing the given goal based on the known ontologies to identify a set of defined vocabulary terms that, collectively, have the same meaning as the given goal and routing the parsed given goal to those network nodes that contain most or all of the set of defined vocabulary terms parsed from the given goal.

16. A system to organize and manage a semantic web service publishing, the system comprising a network with a distributed architecture of multiple independent network nodes, each node to store a subset of semantic web service instances, each semantic web service instance associated with a unique vocabulary used by the semantic web service to process a request, wherein the semantic web service instances are partitioned, assigned, and published to particular network nodes automatically based on a defined vocabulary derived from known ontologies, the defined vocabulary to be distributed over the network nodes so that each network node is associated with a set of the ontologies and at least a portion of the defined vocabulary, the defined vocabulary to be used to describe the respective web service instances, wherein the respective web service instance is found on request by parsing a query based on known ontologies to identify a set of defined vocabulary terms that, collectively, have the same meaning as the query and routing the parsed query to those network nodes that contain most or all of the set of defined vocabulary terms parsed from the query.

17. A non-transitory computer readable storage medium having embodied thereon instructions executable by a processor to perform a method comprising:

organizing and managing a semantic web service discovery within a network with a distributed architecture of multiple independent network nodes, each node being able to store a subset of semantic web service instances, each semantic web service instance being associated with a unique vocabulary used by the semantic web service to process a request; and     automatically computing an assignment of each semantic web service instance to at least one network node based on a defined vocabulary derived from ontologies that is distributed over the network nodes and that is used both in describing and finding that instance on request, the defined vocabulary derived from known ontologies based at least the unique vocabulary and queries for the semantic web service instance, finding the instance on request comprises parsing a request based on the ontologies to identify a set of defined vocabulary terms that, collectively, have the same meaning as the query and routing the parsed request to those network nodes that contain most or all of the ontologies used to parse the request.

\* \* \* \* \*